(12) United States Patent
Simantel

(10) Patent No.: US 6,449,852 B1
(45) Date of Patent: Sep. 17, 2002

(54) CASING AND DOOR JAMB TRIMMER

(76) Inventor: David Simantel, 1411 County Rd. A, New Richmond, WI (US) 54017

( * ) Notice: Subject to any disclaimer, the term of this patent is extended or adjusted under 35 U.S.C. 154(b) by 0 days.

(21) Appl. No.: 09/953,633

(22) Filed: Sep. 17, 2001

(51) Int. Cl.[7] ............................................... B23D 47/02
(52) U.S. Cl. ...................... 30/373; 30/390; 144/136.95; 144/154.5
(58) Field of Search ........................ 30/370, 373, 390; 144/136.95, 154.5, 371

(56) References Cited

U.S. PATENT DOCUMENTS

| | | | | |
|---|---|---|---|---|
| 2,248,694 A | * | 7/1941 | Boyette | 144/136.95 X |
| 2,610,658 A | * | 9/1952 | Koeling | 144/136.95 X |
| 2,992,482 A | * | 7/1961 | Smith | 144/136.95 |
| 3,111,969 A | * | 11/1963 | Bivens | 144/154.5 X |
| 4,406,568 A | * | 9/1983 | Rogers et al. | 144/136.95 X |
| 5,657,804 A | * | 8/1997 | Lee | 144/136.95 |
| 5,815,932 A | * | 10/1998 | Presher et al. | 30/373 |
| 5,988,240 A | * | 11/1999 | Markus | 144/136.95 |
| 6,021,826 A | * | 2/2000 | Daniell | 144/371 X |
| 6,260,591 B1 | * | 7/2001 | George | 144/136.95 |

* cited by examiner

*Primary Examiner*—Douglas D. Watts
(74) *Attorney, Agent, or Firm*—Thomas B. Tate

(57) ABSTRACT

A casing and door jamb trimmer comprising a base, a fence, and an arbor which are attachable to a conventional air tool and saw blade. The invention is used to trim casings and door jambs in order to allow flooring to be laid so that it fits perfectly with the door jamb.

3 Claims, 1 Drawing Sheet

CASING AND DOOR JAMB TRIMMER

BACKGROUND OF THE INVENTION

The field of the invention is attachments to tools used for trimming door jambs and casings.

When constructing a new house, door jambs and casings are often installed before the flooring is laid. Therefore, the jambs and casings must be trimmed to the proper distance above the sub-floor in order for the flooring to fit perfectly flush underneath the door jambs and casings. Electric tools, such as the Crain No. 550 inside corner saw and No. 785 toe-kick saw, are currently used for this purpose. However, because these devices have a large blade, they are difficult to use in small areas, especially inside corners. An additional problem is that these tools must be plugged into an electrical outlet, which is not always available at construction sites.

SUMMARY OF THE INVENTION

The invention is an attachment for trimming door jambs and casings. The device includes a base, a fence which serves as a depth guide, and two types of arbors which are used interchangeably for different types of flooring. This device is used as an attachment to a conventional air tool, for example, the type manufactured by Dotco, and with a conventional saw blade which the arbor holds in position.

An advantage of the invention is that the tool is smaller than the electrical ones on the market and thus fits into tighter areas, avoiding the need to use hand saws or chisels in tight areas. The invention is especially good for cutting door jambs on inside corners for a perfect fit.

Another advantage of the invention is that it can operate off of an air compressor; therefore the lack of electricity at a job site is not a problem.

DETAILED DESCRIPTION OF THE INVENTION

Figure 1:
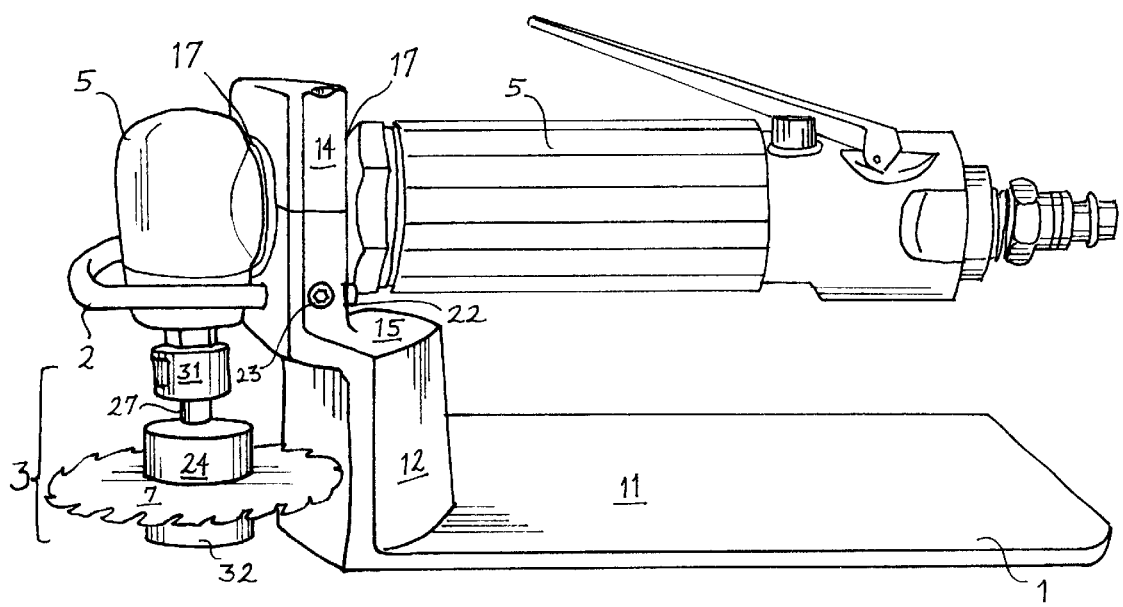
FIG. 1 is a side view showing the base, the fence, and one type of arbor in use with a conventional air tool and saw blade.
Figure 2:
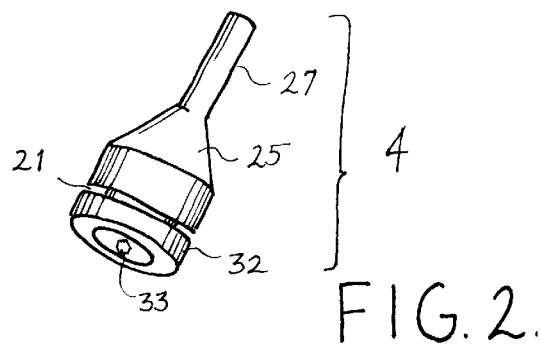
FIG. 2 is a perspective view showing the other type of arbor.

In the drawings, the base 1, the fence 2, and the two types of arbors 3 and 4 comprise the casing and door jamb trimmer which is my invention. These components are used in combination with a conventional air tool 5 (the one shown is manufactured by Dotco) and a conventional saw blade 7 (the one shown is manufactured by Oldham). All parts of my invention are preferably made of metal.

The base 1 has a long, flat, generally rectangular bottom part 11, a generally arcuate middle part 12 which projects upwardly from one end of the bottom part 11 and which forms a flange 15 at its upper end, and a top part 14 which is generally rectangular and which projects upwardly from flange 15 of the middle part 12 at approximately right angles to the bottom part 11 and the middle part 12. The base 1 is sturdy and well-balanced in order to support the air tool 5 when in use. The air tool 5 fits through an opening 17 formed into the top part 14 of the base 1 so that the horizontal part of the air tool is supported in parallel spaced relationship with the bottom part 11 of the base 1, and the vertical part of the air tool projects downwardly from the back end of the top part 14 of the base 1.

The fence 2, which serves as a depth gauge for the blade 7, is a U-shaped bracket which projects rearwardly from the lower end of the top part 14 of the base 1. The fence 2 fits into two openings 22 in the top part 14 of the base 1, and is held in position by a screw 23 at each side of the top part 14 of the base 1.

Two arbors 3 and 4 can be used in this invention, depending upon the type of flooring to be laid. Arbor 3 can be removed and replaced with arbor 4, and vice-versa, as needed. Arbor 3 has a main body portion 24 which is straight across on top and is used to set the blade 7 three quarters of an inch above the sub-floor. Arbor 3 is used to trim door jambs and casings in order to lay hardwood flooring or ceramic tile. Arbor 4 has a main body portion 25 which is sloped conically on top and is used to set the blade 7 at a shallower angle, three eighths of an inch above the sub-floor. Arbor 4 is used to trim door jambs and casings in order to lay vinyl flooring or carpeting. Arbors 3 and 4 are otherwise similar in structure, each having a shaft 27 which projects upwardly from the main body 24 or 25, and which fits into an opening in the collett 31 of the air tool 5. Arbors 3 and 4 each have a bottom part which is a blade holder 32. Blade holder 32 holds the blade 7 in the space 21 formed between the blade holder 32 and the main body 24 or 25. The blade holder 32 is held in position by a flathead screw 33 which is countersunk into the bottom surface of blade holder 32.

To use the invention, the main body portion 24 of arbor 3 or the main body portion 25 of arbor 4 is placed against the doorjamb, with the blade 7 under the doorjamb to be trimmed.

I claim:

1. A casing and door jamb trimmer for use in combination with an air tool and a saw blade, said trimmer comprising:

a base having a long, flat, generally rectangular bottom part, a generally arcuate middle part projecting upwardly from one end of said bottom part and forming a flange at the upper end of said middle part, and a generally rectangular top part projecting upwardly from said flange of said middle part at approximately a right angle to said middle part and said bottom part, said top part having an opening defined therein to allow said air tool to project therethrough and be supported by said base;

a fence comprising a U-shaped bracket which projects rearwardly from said base;

and an arbor which connects said air tool to said saw blade, said arbor comprising a shaft which connects to said air tool, a main body portion connected to said shaft, and a blade holder which connects to said main body portion in spaced relationship by means of a screw, said saw blade being held in position in the space formed between said main body portion and said blade holder.

2. The trimmer of claim 1 wherein said main body portion of said arbor is formed so that it is straight across on top.

3. The trimmer of claim 1 wherein said main body portion of said arbor is formed so that it is sloped conically on top.

* * * * *